Dec. 14, 1948.     R. DAON     2,455,919
REAR VIEW MIRROR MOUNTING
Filed Feb. 7, 1946
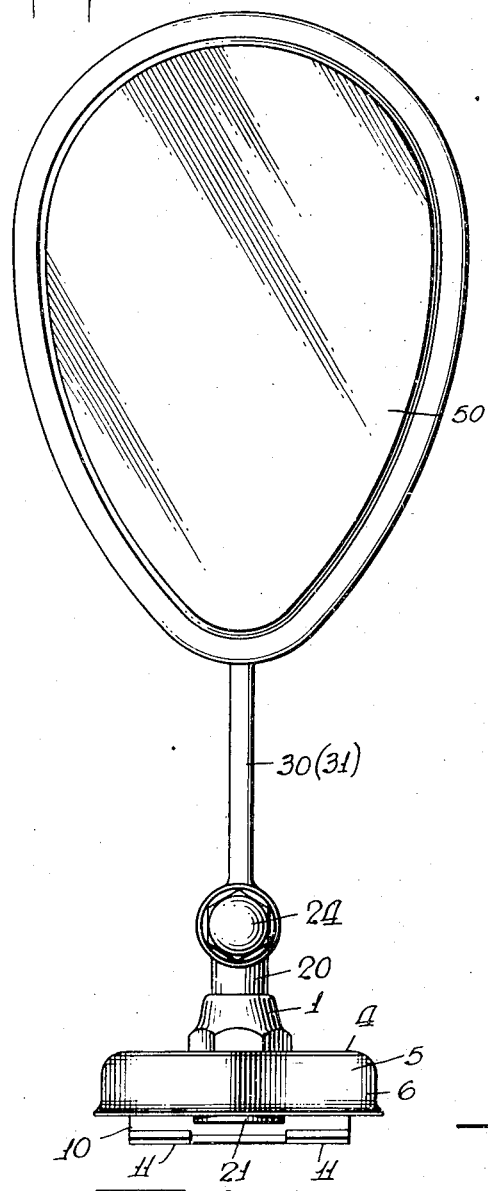
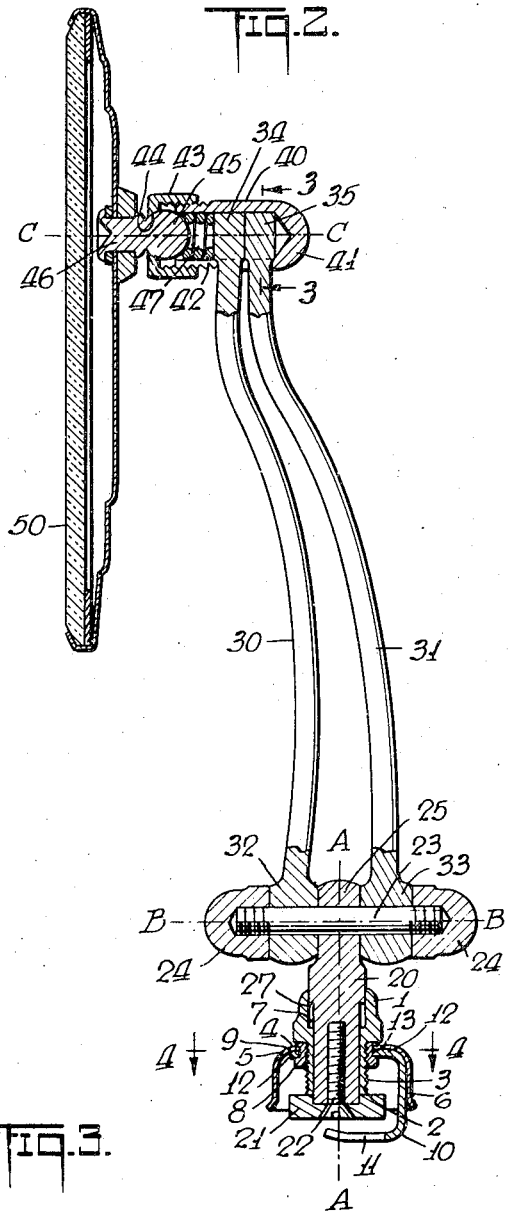
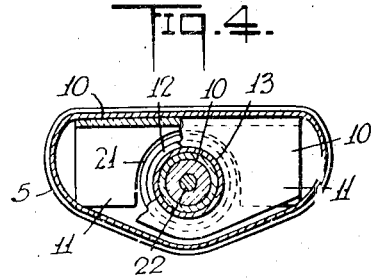
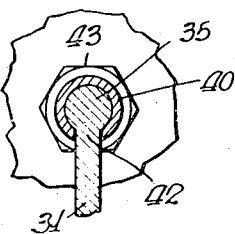
INVENTOR
Rene Daon
BY
ATTORNEY Patented Dec. 14, 1948

2,455,919

UNITED STATES PATENT OFFICE 2,455,919

REARVIEW MIRROR MOUNTING

Rene Daon, Norwalk, Conn., assignor to Yankee Metal Products Corp., Norwalk, Conn., a corporation of New York Application February 7, 1946, Serial No. 646,073

5 Claims. (Cl. 248—226)

1

This invention relates to rear view mirrors for automobiles and, more particularly, of the type which is secured externally of the automobile.

One object of the invention is to provide a rear view mirror which may be secured externally of an automobile without the necessity of drilling or otherwise marring the surface of the automobile. An allied object is to provide a rear view mirror which may be secured externally of an automobile at any desired point in front of the driver. A specific object of the invention is to provide a rear view mirror which may be attached to the flange of the left, forward door, more particularly, to the flange at the forward or distal edge of the door. An allied object is to provide a bracket attachment for the novel rear view mirror which may be secured at any point of the said door flange and without drilling or otherwise marring the flange, the door or the door jamb. A further object is to provide a bracket arm assembly for a rear view mirror attachable to the door flange which is capable of a number of adjustments to present the mirror in the proper position relative to the driver notwithstanding the great variety in the shape or outline of the door, particularly, in the inclination of its forward edge (paralleling the inclination of the windshield) and in the curved contour between the inclined forward edge and the top edge of the door. An allied object is to provide a bracket arm assembly for a rear view mirror attachable to the door flange which is readily adjustable to the eye level of drivers of different heights. A further object is to provide an improved bracket arm assembly for supporting a rear view mirror from its attachment on the door of an automobile.

For the attainment of these and such objects of invention as may appear or be pointed out herein, I have shown an embodiment of my invention in the accompanying drawing, wherein:

Fig. 1 is a front view of the novel rear view mirror;

Fig. 2 is a sectional elevation thereof;

Fig. 3 is a detail section taken on the line 3—3 of Fig. 2; and

Fig. 4 is a detail section taken on the line 4—4 of Fig. 2.

The novel rear view mirror is secured, as mentioned above, to the forward or distal flange of the left, forward door of the automobile by an attachment device which includes an attachment bracket 10. The attachment device will be subsequently described in detail, but at this point it suffices to state that the door flange (not shown) is received between a pair of lips 11, 11 at the lower portion of bracket 10, see Fig. 2 and also Fig. 1, and a disc 21 secured, as by countersunk screw 22 to the lower end of a short spindle 20. When the attachment is firmly made to the door flange, as will be seen, spindle 20 is held stationary and extends normal and substantially horizontally to the door. Being at all times in this position, the axis A—A longitudinally through spindle 20 will be referred to as the "horizontal axis."

The outer end of spindle 20 is provided with a hole in which is rotatively held a stud bolt threaded at each end to receive cap nuts 24, 24. The outer end of the spindle is recessed at 25 to present parallel flat surfaces. Bracket arms 30 and 31 are pivotally mounted on the stud bolt 23 and, for this reason, the proximal ends of bracket arms 30 and 31 are provided with enlargements, respectively, 32 and 33, both having parallel flat surfaces so that they may be placed in abutting relation to the flattened end 25 of the spindle and the flat faces of the cap nuts 24, 24; bracket arm enlargements 32, 33 are each provided with a hole to receive the stud 23. The distal ends of bracket arms 30, 31 hold the mirror 50, in a manner subsequently described.

The entire device, including mirror 50 and bracket arms 30, 31, may thus be turned 360°, together with spindle 20, on horizontal axis A—A, to afford what might be termed the "initial adjustment" of the device. The initial adjustment, about horizontal axis A—A, is made at the time the device is attached to the door flange. The means for holding the spindle 20 against turning on its longitudinal axis A—A, after the initial adjustment had been made, and for securing the device to the door flange will now be described with reference to Fig. 2. The attachment bracket 10 is somewhat in the shape of a channel, except that instead of a lower flange, it has a pair of lips 11. The upper flange 12 of the attachment bracket is provided with a hole 13 to enable upper flange 12 to be tightly fitted into the recess or groove 9 of a nut 8. Nut 8 is screwed on the threads 2 of the reduced portion 3 of a sleeve nut 1 which is rotatively and slidably mounted on the spindle 20. In addition to the upper flange 12 of attachment bracket 10, there is also tightly held in the groove 9 of nut 8, the top wall 4 of a housing 5 which is in the form of a shell having a side wall or skirt 6 in flanged relation to its top wall 4. The edge of skirt 6 of the housing abuts the door surface, so that the housing completely conceals the lower parts, Fig. 2, of the attachment device. The upward movement of sleeve nut 1 relative to spindle 20 may be limited by the abutment of a shoulder 7 on the nut with a shoulder 27 on the spindle.

Inasmuch as nut 6 is held against rotation by the attachment bracket 10 and housing 5 which are tightly fitted in its recessed groove 9, turning of sleeve nut 1 will cause it to move longitudinally of spindle 20, the housing 5 (or attachment bracket 10) being held by hand against turning. It will be noted from Fig. 2 that the lower end of sleeve nut 1 abuts disc 21 secured on spindle 20. The extent of longitudinal sliding movement of spindle 20 is thus confined to the restricted movement of its disc 21 between abutment with the end of sleeve nut 1 and lips 11 of the attachment bracket. To separate the disc and the lips, sleeve nut 1 is turned in a direction to cause the sleeve nut to move upwardly relative to spindle 20. To bring the disc and lips closer, the sleeve nut is turned in the opposite direction causing a downward movement of the sleeve nut relative to the spindle, until the lower end of the sleeve nut abuts disc 21; further turning of the sleeve nut then causes movement of the spindle towards lips 11. To secure the device in place, the lips 11' and disc 21 are first separated, by turning sleeve nut 1 (as described above) and the device placed in the desired position on the door with the door flange received between lips 11 and disc 21. The sleeve nut 1 is then turned in the opposite direction to cause the lips and the disc to approach one another. Before the sleeve nut is fully tightened, i. e., while it is still possible to turn spindle 20, the aforementioned initial adjustment is made about the horizontal axis A—A. Thereafter the sleeve nut is fully tightened to hold the device firmly on the door flange. In this tightened state, the spindle 20 is prevented from turning on its longitudinal axis A—A by frictional abutment of its disc 21 with the door flange. To prevent marring of the door flange, a folded strip of non-resilient material, such as thin fibre board, may be slipped on the flange to avoid direct contact between the flange and the disc 21 and between the flange and lips 11.

Having secured the device in place on the door after making the aforementioned initial adjustment on horizontal axis A—A, the cap nuts 24, 24 are slightly loosened to permit bracket arms 30, 31 to be turned about axis B—B, Fig. 2, which will be referred to as the "proximal axis" since it is at the proximal ends of bracket arms 30, 31. It will be noted that proximal axis B—B itself may be oriented at any angle, since spindle 20 is turnable 360° on its axis A—A; the angular orientation of proximal B—B will depend on the aforementioned initial adjustment. Bracket arms 30, 31 may be turned approximately 180° on proximal axis B—B, the extent of turning being limited by abutment of the lamp 50 with the door. Having turned the bracket arms 30, 31 (about axis B—B) to the desired position, i. e., in the desired angular position relative to the door, the nuts 24, 24 are then tightened.

The distal ends of bracket arms 30, 31 are provided with disc enlargements, respectively 34, 35, see Figs. 2 and 3, which are received within a thimble 40, rounded (41) at its closed end. Thimble 40 is provided with a slot 42, Fig. 3, extending longitudinally from its open end to closed end 41, Fig. 2, through which the bracket arms 30, 31 clear. As shown in Fig. 2, the disc enlargements 34, 35 are in abutting relation. Thimble 40 is threaded at its open end for a cap nut 43, which is provided with a hole 44, the edge of which is curved to serve as a spherical seat for a ball 45. Ball 45, which is at one end of a plug 46 to the other end of which is secured the mirror 50, together with spherical seat 44 constitute a ball and socket universal joint. A coil spring 47 is interposed between the disc enlargement 34 and ball 45.

The third and final adjustment is made about the axis C—C, longitudinally through thimble 40, and about the ball 45. The nut 43 is first loosened to enable mirror 50 to be turned 360° on axis C—C and to be turned, within a limited extent, to positions in which the mirror is set at the desired angle relative to axis C—C. That is, the mirror may be tilted relative to axis C—C so as to make an angle therewith other than normal (as shown in Fig. 2). Nut 43 is then tightened to hold the mirror in adjusted position.

I claim:

1. A rear view mirror assembly to be secured externally of an automobile door of the type having a spindle extending normally to the door, a rear view mirror and bracket means between said spindle and mirror, in combination, a device for securing the assembly to the flange of the door and for holding said spindle against turning after initial adjustment of the assembly 360° about the spindle, a pair of bracket arms the proximal ends of which are pivotally mounted at the extended end of said spindle with one arm on each side of the spindle, for turning on an axis through said pivots and normal to said spindle, and means for holding the bracket arms against turning after adjustment about said proximal axis, the distal ends of said pair of bracket arms being in abutting relation.

2. A rear view mirror assembly to be secured externally of an automobile door of the type having a spindle extending normally to the door, a rear view mirror and a bracket arm between said spindle and mirror, in combination, a device for securing the assembly to the flange of the door and for holding said spindle against turning after initial adjustment of the assembly 360° about the spindle, said bracket arm being pivotally mounted on said spindle for turning on an axis disposed normal to said spindle, and means for holding the bracket arm against turning after adjustment about said proximal axis.

3. A rear view mirror assembly of the type having a device for attaching the assembly externally of an automobile, a bracket arm the proximal end of which is secured to the attachment device, and a rear view mirror secured at the distal end of the bracket arm, in combination, a thimble provided with a longitudinal slot and with external threads at its open portion, the distal end of the said bracket arm having a disc enlargement seated in the said thimble, the adjacent portion of the arm clearing in the said slot, a cap nut screwed on the said threads, the end wall of the cap nut having an opening, a plug having a ball enlargement at one end passed through the said opening with the said ball contained within the said thimble, said rear view mirror being secured to the outer end of the said plug, and a compression spring in the said thimble interposed between said ball and said disc of the bracket arm.

4. A rear view mirror assembly to be secured externally of an automobile door of the type having a spindle extending normally to the door and presenting a horizontal axis about which the assembly may be turned 360° and a device for securing the assembly to the flange of the door and for holding said spindle against turning after said initial adjustment is made, in combination, a disc secured to the said spindle, a sleeve nut rotatively and slidably mounted on said spindle with one end abutting the said disc, the portion near said abutting end having external threads, a nut screwed on said threads and provided with a recessed groove, an attachment bracket in the shape of a channel, one flange being provided with a hole seating the bracket in the said nut groove with the other flange in spaced relation to the said disc, said sleeve nut being turned to move the said grooved nut in a direction to cause the said spaced flange of the attachment bracket to approach the said disc and frictionally hold the door flange interposed between the said bracket flange and disc and to frictionally hold the said spindle against turning about said horizontal axis.

5. A rear view mirror assembly, to be secured externally of an automobile door of the type having a spindle extending normally to the door and presenting a horizontal axis about which the assembly may be turned 360° and a device for securing the assembly to the flange of the door and for holding said spindle against turning after said initial adjustment is made, in combination, a sleeve nut rotatively and slidably mounted on said spindle and having external threads, a nut screwed on said threads and provided with a recessed groove, an attachment bracket in the shape of a channel, one flange being provided with a hole seating the bracket in the said nut groove with the other flange in spaced relation to one end of said spindle, and a skirted housing concealing the said parts, the outer wall having a hole seating the housing in the said nut groove with the edge of its skirted sides abutting the door, said sleeve nut being turned to move the said grooved nut in a direction to cause the said spaced flange of the attachment bracket to approach the said end of the spindle and frictionally hold the door flange interposed between said bracket flange and spindle end, and to frictionally hold the said spindle against turning about said horizontal axis, and to hold the said housing in abutting relation to the door.

RENE DAON.

REFERENCES CITED

The following references are of record in the file of this patent:

UNITED STATES PATENTS

| Number | Name | Date |
| --- | --- | --- |
| 1,972,246 | Sauer | Sept. 4, 1934 |
| 2,256,763 | Reed | Sept. 23, 1941 |
| 2,299,280 | Reed | Oct. 20, 1942 |
| 2,361,764 | Golden | Oct. 31, 1944 |